(12) United States Patent
Muller

(10) Patent No.: US 12,717,870 B2
(45) Date of Patent: Aug. 25, 2026

(54) ROTATING ACCUMULATOR

(71) Applicant: XMOS LTD, Bristol (GB)

(72) Inventor: Hendkik Lambertus Muller, Cumbria (GB)

(73) Assignee: XMOS LTD, Bristol (GB)

( * ) Notice: Subject to any disclaimer, the term of this patent is extended or adjusted under 35 U.S.C. 154(b) by 1034 days.

(21) Appl. No.: 17/796,175

(22) PCT Filed: Oct. 12, 2020

(86) PCT No.: PCT/EP2020/078580

§ 371 (c)(1), (2) Date: Jul. 28, 2022

(87) PCT Pub. No.: WO2021/160300

PCT Pub. Date: Aug. 19, 2021

(65) Prior Publication Data

US 2023/0116419 A1 Apr. 13, 2023

(30) Foreign Application Priority Data

Feb. 10, 2020 (GB) ..................................... 2001789

(51) Int. Cl.
*G06F 17/16* (2006.01)
*G06F 9/30* (2018.01)

(52) U.S. Cl.
CPC .......... *G06F 17/16* (2013.01); *G06F 9/30032* (2013.01); *G06F 9/30036* (2013.01)

(58) Field of Classification Search
CPC ... G06F 17/16; G06F 9/30036; G06F 9/30032
See application file for complete search history.

(56) References Cited

U.S. PATENT DOCUMENTS

2008/0189513 A1 8/2008 Hutson
2009/0248769 A1* 10/2009 Chua .................... G06F 7/5443 708/620

FOREIGN PATENT DOCUMENTS

CN 107094369 A 8/2017
CN 107408037 A 11/2017
(Continued)

OTHER PUBLICATIONS

Office Action issued Oct. 3, 2023 in Japanese Application No. 2022-548402.
(Continued)

*Primary Examiner* — Emily E Larocque
*Assistant Examiner* — Jerome Anthony Klosterman, II
(74) *Attorney, Agent, or Firm* — Sughrue Mion, PLLC

(57) ABSTRACT

A processing unit for generating an output vector is provided. The processing unit comprises an output vector register and a vector unit and is configured to execute machine code instructions, each instruction being an instance of a predefined set of instruction types in an instruction set of the processing unit. The instruction set includes a vector processing instruction defined by a corresponding opcode, which causes the processing unit to: i) process, using the vector unit, at least two input vectors to generate a result value; ii) perform a rotation operation on the plurality of elements of the output register in which the result value or a value based on the result value is placed in the first end element of the output register.

12 Claims, 12 Drawing Sheets

(56) References Cited

FOREIGN PATENT DOCUMENTS

| | | | |
|---|---|---|---|
| JP | 2007-533009 | A | 11/2007 |
| JP | 2016-530631 | A | 9/2016 |
| WO | 02/084451 | A2 | 10/2002 |
| WO | 2009/073787 | A1 | 6/2009 |
| WO | 2017/030600 | A1 | 2/2017 |

OTHER PUBLICATIONS

International Search Report for PCT/EP2020/078580 dated Feb. 10, 2021.
Written Opinion for PCT/EP2020/078580 dated Feb. 10, 2021.
United Kingdom Search Report for GB2001789.3 dated Aug. 6, 2020.

* cited by examiner

ROTATING ACCUMULATOR

CROSS REFERENCE TO RELATED APPLICATIONS

This application is a National Stage of International Application No. PCT/EP2020/078580 filed Oct. 12, 2020, claiming priority based on Great Brian Patent Application No. 2001789.3 filed Feb. 10, 2020.

TECHNICAL FIELD

The present disclosure relates to a processor having an execution unit for implementing vector operations such as matrix-vector operations.

BACKGROUND

The processor architecture of a given processor is designed to execute instructions instantiated from amongst a particular instruction set. The instruction set of a processor is the fundamental set of definitions of the kinds of machine code instruction that the processor is configured to execute. These includes a number of compute instructions, e.g. arithmetic instructions such as add, multiply, etc. Each instruction executed is an instance of one of the instruction types from the instruction set. Each instruction defined in the instruction set is a machine code instruction formed of an opcode and zero or more operand fields, wherein the opcode specifies the operation to be performed and the operand field(s) (if any) are used to specify one or more operands to be operated upon by the specified operation.

Some processors are configured with a vector processing instruction as part of their instruction set. A typical processor of this type comprises a vector processing unit (VPU) for performing vector operations in response to a corresponding machine code instruction. For example, a VPU may perform a multiply-accumulate operation on two input vectors in response to a corresponding machine code instruction, the output of which is equal to the inner (dot) product of the two input vectors.

SUMMARY

A vector units can be used to perform vector operations which form part of a larger task. However, this requires storing and arranging the result from each individual vector operation accordingly, which can require extra operands in the instruction, memory usage to move the result values, or even both. It would be desirable to provide a more streamlined implementation mechanism.

According to a first aspect disclosed herein, there is provided a processing unit for generating an output vector, the processing unit comprising: an output register having a plurality of elements for holding different components of the output vector, the plurality of elements including a first end element and a second end element; and a vector unit for processing at least two input vectors to generate respective result values; wherein the processing unit is configured to execute machine code instructions, each instruction being an instance of a predefined set of instruction types in an instruction set of the processing unit, wherein the instruction set includes a vector processing instruction defined by a corresponding opcode, the vector processing instruction causing the processing unit to: i) process, using the vector unit, a first input vector and a second input vector to generate a result value; ii) perform a rotation operation on the plurality of elements of the output register in which the result value or a value based on the result value is placed in the first end element of the output register.

In an example, the value placed in the first end element of the output register as part of said rotation operation is the sum of the result value and a value present in the second end element before said rotation.

This particular example has the advantage that a sequence of instructions one after the other, each only needing to adjust a pointer in memory, is able to handle the case in which multiple passes need to be made. This is the case, for example, when implementing a matrix-vector multiplication where the matrix and/or vector are larger than can be processed by the vector unit (or held in the input register).

In an example, the vector unit is configured to perform said processing i) of the first input vector and second input vector by performing a multiply-accumulate operation on the input vectors, the result value being a scalar value resulting from the multiply-accumulate operation.

In an example, the vector unit is configured to access at least the second input vector directly from a memory.

In an example, the processing unit comprises an input register for holding at least the first input vector, and the vector unit is configured to access the first input vector from the input register.

In an example, the input register is selected from a plurality of registers in a register file and the vector processing instruction includes an operated specifying the input register.

In an example, the input register is implicit in the opcode of the vector processing instruction, not specified by an operand of the vector processing instruction.

In an example, the output register is selected from a plurality of registers in a register file and the vector processing instruction includes an operand specifying the output register.

In an example, the output register is implicit in the opcode of the vector processing instruction, not specified by an operand of the vector processing instruction.

According to a second aspect disclosed herein, there is provided a method, performed by a processing unit, of generating an output vector at an output register having a plurality of elements for holding different components of the output vector, the plurality of elements including a first end element and a second end element, wherein the processing unit is configured to execute machine code instructions, each instruction being an instance of a predefined set of instruction types in an instruction set of the processing unit, wherein the instruction set includes a vector processing instruction defined by a corresponding opcode, the method comprising the vector processing instruction causing the processing unit to implement a vector processing operation of: i) processing, using the vector unit, a first input vector and a second input vector to generate a result value; and ii) performing a rotation operation on the plurality of elements of the output register in which the result value or a value based on the result value is placed in the first end element of the output register.

In an example, the value placed in the first end element of the output register as part of said rotation operation is the sum of the result value and a value present in the second end element before said rotation.

In an example, the first input vector is stored in a register and the method comprises executing a plurality of said vector processing operations using the same first input vector. For example, this may be used to perform a matrix multiplication.

In an example, the method comprises, following completion of a plurality of said vector processing operations, outputting the values present in the output register to a storage location.

In an example, the method comprises, following completion of a plurality of vector processing operations which is not equal to an integer multiple of the number of elements in the output register, performing one or more rotation operations on the output register without altering the values present in the elements of the output register such that the total number of rotations is equal to an integer multiple of the number of elements in the output register.

According to a third aspect disclosed herein, there is provided a computer system comprising the processing unit according to the first aspect, programmed to perform the method according to the second aspect.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
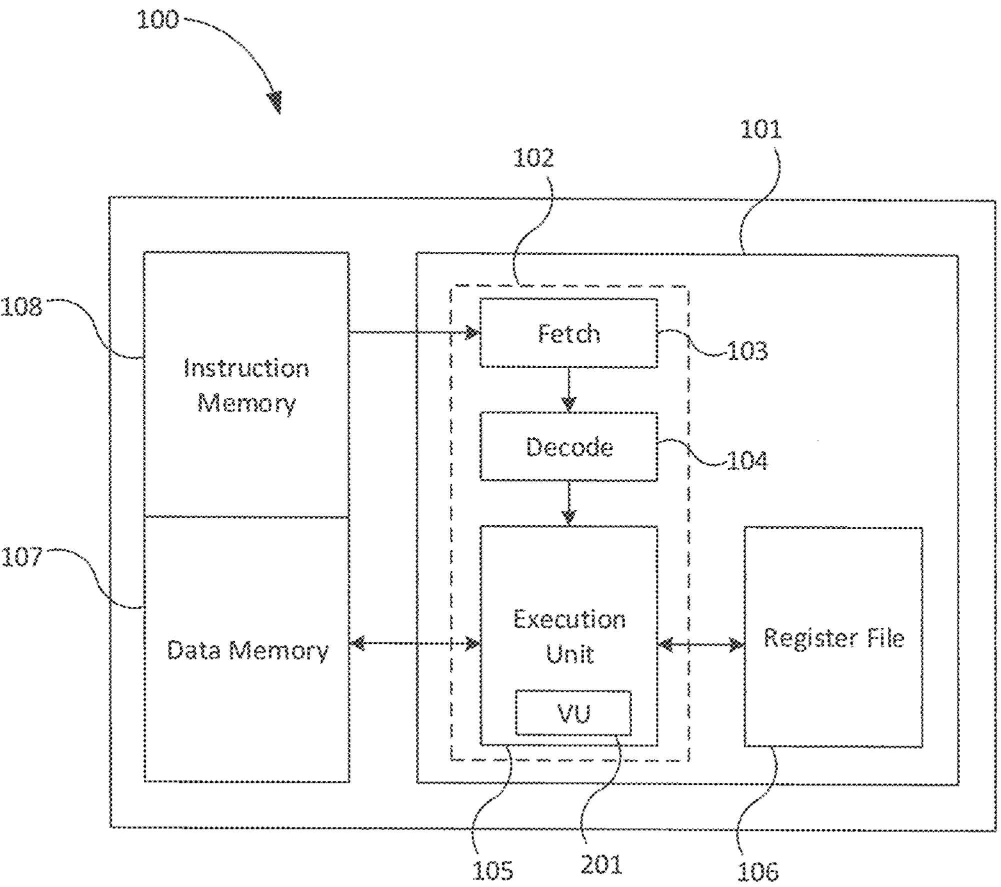
FIG. 1 shows schematically a computer system in accordance with examples described herein.

The present disclosure relates to designing an instruction and micro-architectural structure which can be used to efficiently implement matrix-vector operations.

As used herein, the term "instruction" refers to a machine code instruction, i.e. one of the fundamental instruction types of the instruction set of a processor, each instruction type defined by a single opcode and one or more operand fields. An operand can be an immediate operand, i.e. the value to be operated upon is encoded directly into the instruction; or alternatively an operand can take the form of an indirect operand, i.e. an address where the value to be operated upon can be found. For instance an add instruction may take three pointers as operands: two specifying addresses from which to take values to be added, and another specifying a destination address to which to write the result. In practice, the values in the source operand fields of a vector multiplication instruction or the like will typically be pointers to vector registers holding the actual vector values to be worked on, as opposed to immediate operands.

An example of a vector operation is a matrix-vector operation. Matrix-vector operations are used in many fields of computing. For example, matrix-vector products can be used to implement a convolution layer in a deep learning environment such as a convolutional neural network. In such cases, an input array of values (e.g. an array of pixel values for an image) may be convolved with one or more filters (also called kernels). This comprises determining an inner (dot) product of the filter and a subset of the input array called the receptive field. An inner product is determined for each receptive field as the filter is passed over the input array. Each inner product, so determined, represents a different value in an output array called an activation map or a feature map. Hence, the convolution layer can be considered to be the multiplication of a vector (representing the filter) with a matrix, (each row of the matrix representing a different receptive field). This operation may be performed more than once, e.g. on each individual colour channel of an RGB image.

In general, determining the product of a vector V and a Matrix M involves determining multiple inner products, as each element in the output vector A corresponds to the inner product of the input vector V with a (different) row of the input matrix M.

On a traditional micro-processor, the computation to calculate an inner product comprises a loop that multiples and accumulates each item in turn. For instance, this may be expressed as:

```
def vectorXvector(V1,V2):
  sum = 0
  for i in range (len(A)):
    sum = sum + V1[i] * V2[i]
  return sum
```

Here, the "for" loop implements the element-wise multiplication and accumulation to product the final inner product value ("sum").

For matrix computation, this involves two loops as follows:

```
def matrixXvector (A, M, V):
  for i in range(len(A)):
    sum = 0
    for j in range(lenV):
      sum = sum + M[i,j] * V[j]
    A[i] = sum
```

Here, the inner "for" loop (over index j) implements the inner product, as before, and the outer "for" loop (over index i) loops this inner product over each row of the matrix M. The result of the nth inner product determines the nth element A[n] of the output vector A.

This can be sped up by using a vector processing unit (also referred to simply as a vector unit, VU). Vector units themselves are known in the art. A vector unit may, for example, determine the inner product of two input vectors by performing a number of multiple-accumulate (VMA) operations simultaneously.

As a specific example, a vector unit may calculate 16 multiplications at once, followed by an accumulation operation in which the total (sum) of the 16 individual multiply operations is determined and output. Such an operation may take the following form:

```
def vectorXvector (V1, V2):
  sum = 0
  for i in range (0, len(V1), 16):        #step of 16
    sum = VMA(sum, V1[i:i+16], V2[i:i+16])
  return sum
```

This will be 16 times faster, at the expense of having 16 multipliers in place (the vector unit). This operation can also be used on a matrix as follows:

```
def matrixXvector(A, M, V):
  for i in range(len(A)):
    sum = 0
    for j in range (0, len(V), 16):       #step of 16
      sum = VMA(sum, M[i, j:j+16], V[j:j+16])
    A[i] = sum
```

Similarly to above, the inner "for" loop (over index j) implements the inner product and the outer "for" loop (over index i) loops this inner product over each row of the matrix M.

Again, the result of the nth inner product determines the nth element A[n] of the output vector A. In other words, when implementing such a process as described above, the output values from the vector unit are used to construct the final output vector. That is, the result of passing the vector V and the nth row of matrix M to the vector unit is a scalar value (the inner product) which corresponds to the nth element (element zero) of the output vector. In the example above, this comprises 16 values which need to be written to the correct respective elements of the final output vector.

In order to ensure that the output vector is constructed correctly from the individual output values from the vector unit, conventionally there are two options.

The first option is to use a small portion of the register file to build up a single result, i.e. store the output values from the vector unit in a conventional scalar register and then construct the final vector in a vector register by reading these values into the vector register from the scalar registers. A disadvantage of this is that it requires more memory bandwidth because the values need to be repeatedly loaded.

The second option is to use an explicit index in the vector register as to where to accumulate the result, i.e. ensure that each output from the vector unit gets written to the correct element in a vector register upon output from the vector unit. A disadvantage of this is that it requires an extra operand in order to specify the location in the vector register to which the output is to be written.

The present disclosure provides more a more efficient implementation by providing an instruction and corresponding micro-architectural structure which enables the output vector to be automatically constructed by repeated application of the instruction, without requiring repeated loading of values or any extra information to specify the location in the vector register (i.e. to specify which value corresponds to which element of the output vector). This enables efficient matrix-vector multiplication or the like with just a single operand.

Typically, the matrix and vector are much larger than any register set can hold and therefore the input vector can be longer than the number of elements which can be stored in the vector unit. In such cases, multiple passes need to be made. This results in yet more output values. Hence, another challenge is to load the right bit of data in the register set, and to load the rest of the data from memory in turn. The present invention provides an improvement to this, as all that may be required to handle this complexity is to generate a sequence of instructions one after the other that only needs to adjust a pointer in memory.

FIG. 1 illustrates an example computer system 100 comprising a processor 101. The processor 101 comprises a pipeline 102 comprising a series of pipeline stages. For example, the pipeline may comprise a fetch stage 103 that fetches an instruction, a decode stage 104 that decodes the instruction, and an execution unit 105. The execution unit 105 may comprise one or more stages, e.g. a register read stage that reads from a register file 106, a compute stage that performs computations, one or more memory access stages that may address memory, may read and write data to memory, etc., depending on the instruction. Note that the particular pipeline stages shown in FIG. 1 are illustrated here by way of example but this is not limiting, and the skilled person will be aware of other possible pipeline variants.

The processor 101 may comprise a scheduler (not shown) coupled to the fetch stage 103. The execution unit 105 (e.g. the memory access stages of the execution unit 105) is coupled to a data memory 107. The input of the instruction fetch stage 103 is coupled to a separate instruction memory 108. The processor 101 comprises a register file 106, which comprises at least one set of registers. Note also that most generally, a register file as referred to herein can refer to any group of registers up to the total set of addressable registers on the processor and does not limit to any particular physical module or sub-division in the register address space. In particular, the register file 106 comprises one or more vector registers, as described later below.

The data memory 107 is the memory where the data to be operated upon by computations and the results of the computations may be ultimately stored. The data memory 107 may be stored on the same physical unit as the processor 101. Alternatively, the data memory 107 may be storage on a separate unit, e.g. an external memory. In embodiments such as shown in FIG. 1, the instructions are stored in, and fetched from, an instruction memory 108 that is separate from the data memory 107. These may be separate memory devices or separate regions of the same memory device. Either way, since the instruction memory 108 and data memory 107 have non-overlapping address spaces, this means there is no risk that the instruction fetches performed by the fetch stage 103 will contend with the data access (load or store) being performed by the memory access stages. The data memory may comprise, but is not limited to, volatile storage (e.g., random access memory), non-volatile storage (e.g., read-only memory), flash memory, or any combination of such memories.

The execution unit 105 is able to perform a limited set of operations in response to instructions from a predefined set, called the instruction set. A typical instruction set may comprise, for example, instructions such as LOAD, ADD, STORE, etc. which the execution unit 105 is configured to understand and implement in response to a respective instruction. Accordingly, the execution unit 105 generally comprises one or more arithmetic computation units for executing such instructions, such as a fixed point arithmetic unit (AU), logic unit (LU), arithmetic logic unit (ALU), and floating point unit (FPU). Arithmetic refers to mathematical operations on numbers: e.g. multiply, add, divide, subtract, etc. Compute can constitute a much wider set: e.g. if operand 0 is true, then operand 1 is stored in the destination, else operand 2 is stored in the destination. As illustrated in FIG.

1, the execution unit 105 also comprises a vector unit 201, which is discussed in more detail below.

In accordance with examples described herein, the execution unit 105 is configured to implement a novel type of instruction, referred to herein by way of example as VLMACCR (vector-load-multiply-accumulate-reduce).

Figure 2:
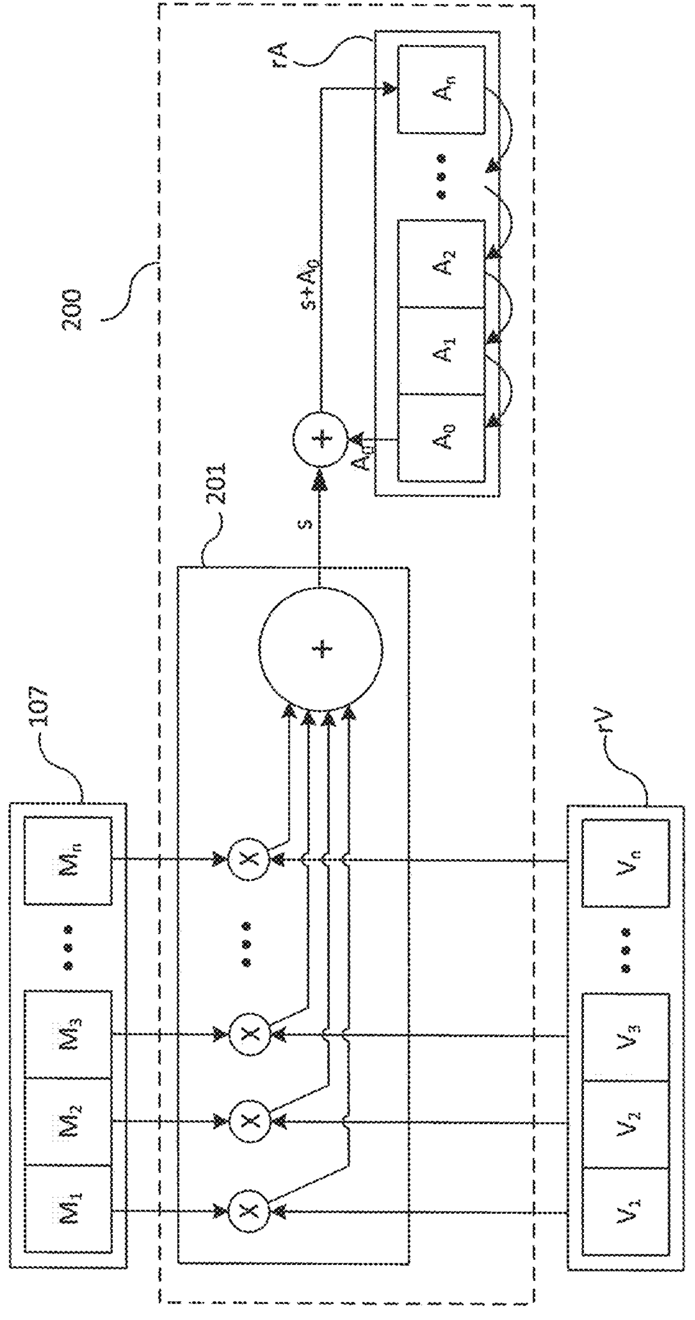
FIG. 2 shows schematically a first example implementation of a vector processing instruction.

FIG. 2 shows schematically an example implementation of the VLMACCR operation using a processing unit 200 configured to implement the VLMACCR operation in response to a corresponding instruction The VLMACCR operation itself is described below with reference to FIG. 3.

The processing unit 200 comprises a vector unit 201 and an output register rA. Also shown in FIG. 2 is an input register rV and the memory 107 described earlier. The input register rV may or may not form part of processing unit 201. Similarly, the memory 107 may or may not form part of the processing unit 201.

The output register rA and input register rV are vector registers. A vector register is a register comprising a plurality of elements for holding different components of a vector. The output register rA and input register rV may be implemented as part of the register file 106 described earlier (e.g. specified by an operand of the VLMACCR instruction). Alternatively, one or more of the output register rA and input register rV may be an implicit register which is automatically used by the vector unit 201 (does not need to be specified by an operand). Hence, it is understood that although specific registers rV, rA are illustrated in the figures, the registers themselves may not be fixed. That is, there may be more registers useable by the processing unit 200 and one or more of rV and rA may be picked from a set of registers (e.g. in the register file 106). The vectors to use may be specified by operands of the VLMACCR instruction (e.g. by specifying a register in which the vector(s) is/are stored).

Note that the output register rA does not need to be the same length as the input register rV. The two end elements of the output register rA are referred to herein as a first end element and a second end element. It is understood that these are relative terms. That is, if the first end element is the left-most element (as illustrated in FIG. 2), then the second end element is the right-most element, and vice-versa. Similarly, if the first end element is the top-most element, then the second end element is the bottom-most element.

The registers rV and rA may store elements of different types and/or widths. In one example, rV may store 8-bit integers, and rA may store 32-bit integers. Other formats are possible, e.g. 32-bit float, or 16-bit float, or types can be mixed.

The vector unit 201 may be implemented as part of the execution unit 105 described above. Alternatively, the vector unit 201 may be implemented as a separate unit from the execution unit 105 itself. In either case, the vector unit 201 may be operatively coupled to the memory 107.

The vector unit 201 is configured to perform an operation on at least two input vectors to generate a result value. In the example shown in FIG. 2, the vector unit 201 is operatively coupled to the input register rV which holds a first input vector V and to the memory 107 which holds a second input vector M. In other examples, both V and M may be stored in a respective register for use by the vector unit 201.

In the example shown in FIG. 2, the operation performed by the vector unit 201 is an inner product and hence the result value generated by the vector unit 201 from the input vectors V and M is a scalar value equal to the inner product of V with M. In one particular implementation of an inner product of 1-bit numbers, '0' may be used to represent −1 and '1' to represent +1 (or the other way around). In such cases, the products are always +1 or −1 (i.e. a NOT-XOR operation), and the sum of values is simply the sum of these −1 and +1 bits, which is the population count. This is an example of a very low resolution but highly parallel inner product. Operations other than an inner product may be performed by the vector unit. For example the vector unit may be able to simply add two vectors together in a point wise addition (for k in range(len(V0)): V2[k]=V0[k]+V1[k]). Multiplication, subtraction, or absolute value are other examples.

Figure 3A:
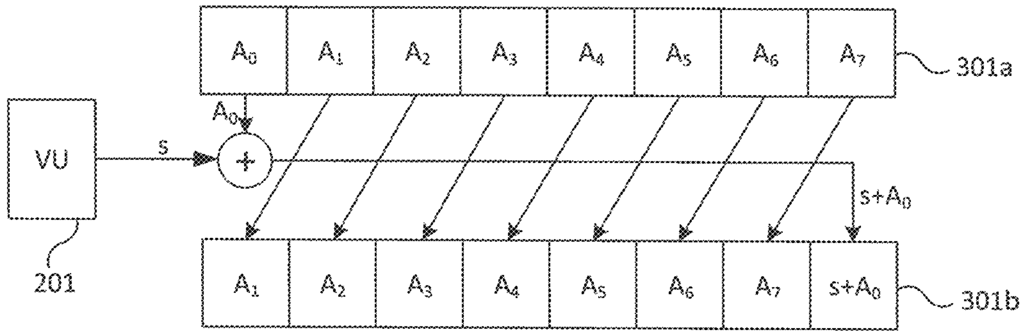
FIG. 3*a* and FIG. 3*b* show schematically two examples of the rotation operation in more detail.

FIG. 3*a* shows schematically a first example VLMACCR operation. In this example, the output register rA comprises eight elements. The initial state 301*a* and final state 301*b* of the output register rA are shown. In the initial state, the eight elements of the output register rA hold values $A_0$ to $A_7$, in sequence. These values may be initialised to zero, as discussed in more detail later below.

The vector unit 201 processes a first input vector V and a second input vector M to generate a result value s. As mentioned above, this may comprise the vector unit 201 determining an inner product of V and M.

The values in the elements of the output register rA are updated using the initial state values $A_0$ to $A_7$, along with the result value s, as shown in FIG. 3*a*. That is:

Each value in the output register rA shift left by one (i.e. the value from element n moves to element n−1).

The value in the left-most element $A_0$ is added to the result value s and the total is placed in the right-most ($n^{th}$) element of the output register rA.

Figure 3B:
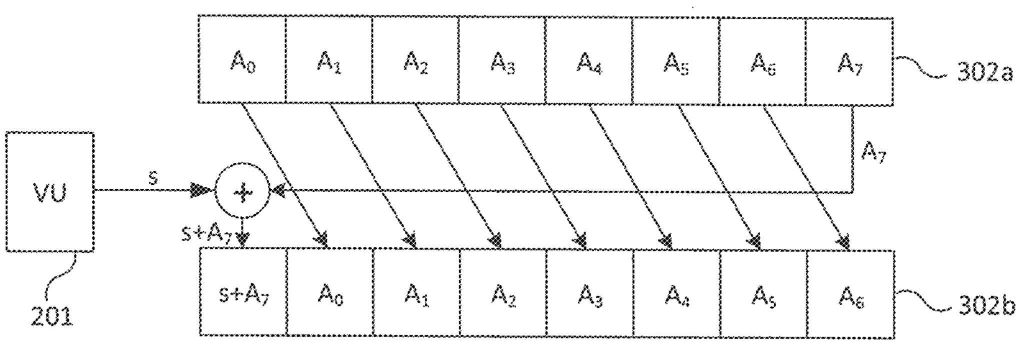

FIG. 3*b* shows schematically a second example VLMACCR operation. This example is similar to that of FIG. 3*a* except that the values in the output register rA are shifted to the right. Again, the initial state 302*a* and final state 302*b* of the output register rA are shown. In the initial state, the eight elements of the output register rA hold values $A_0$ to $A_7$, as before.

Again, the values in the elements of the output register rA are updated using the initial state values $A_0$ to $A_7$, along with the result value s, as shown in FIG. 3*a*. However, this in this example:

Each value in the output register rA shift right by one (i.e. the value from element n moves to element n+1).

The value in the right-most element $A_{n-1}$ is added to the result value s and the total is placed in the left-most (first) element of the output register rA.

As can be seen from the two examples above, the result value s from the vector unit 201 is added to whichever component of the output vector moves between the first end element and the second end element (this depends on the rotation direction). The other values (which do not move from one end of the output register rA to the other) simply move one element to the left (or right), without having anything added to them.

Hence, this step is a rotation operation (also called a circular shift) on the plurality of elements of the output register in which the result value is added to a component of the output vector which moves between the first end element and the second end element. In other examples the operation performed on the result value and the component of the output vector which moves between the first and second end element is another mathematical or logical operation, e.g. a multiplication, XOR, subtraction, etc.

As the values stored to the elements in the output register rA are added to (one at a time, as the output register rA rotates), the elements may be referred to as accumulators.

The output register rA itself may be referred to as an accumulator for similar reasons.

The rotation operation may be implemented using flops. In such an implementation, the data is simply routed around, including a combinatorial element (e.g. an adder) on the route from the last to the first element (depending on which way the register is to be rotated). In an alternative implementation, a carry register can be used to temporarily store one value while the other values are shifted.

The VLMACCR operation described above may be represented, for example, using the following pseudo-code:

```
def vlmaccr(address):
  sum = 0
  for i in range(32):
    sum = sum + rV[i] * memory[address+i]
  sum = sum + rA[7]
  for j in range(1,8):
    rA[j] = rA[j-1]
  rA[0] = sum
```

In this example, the vectors V and M both comprise 32 components and the output register rA comprises eight elements (accumulators) for holding output values. M is stored in memory 107, the first element of M being located at memory address "address". The first "for" loop implements a multiply-accumulate operation (inner product). The second "for" loop implements a right rotation of the output register rA in which the result of the multiply-accumulate operation are written to the first element of the output register rA.

As mentioned above, the processing unit 200 and VLMACCR instruction can be used to efficiently implement matrix-vector multiplication.

```
def matrixXvector(A, M, V):
  for i in range(0, len(A), 8):
    rA[ ] = 0
    for j in range (0, len(V), 16):
      rV = V[j:j+16]
      for k in range(8):
        vlmaccr(address__of(M[i+k, j:j+16))
    A[i:i+8] = rA
```

Figure 8:
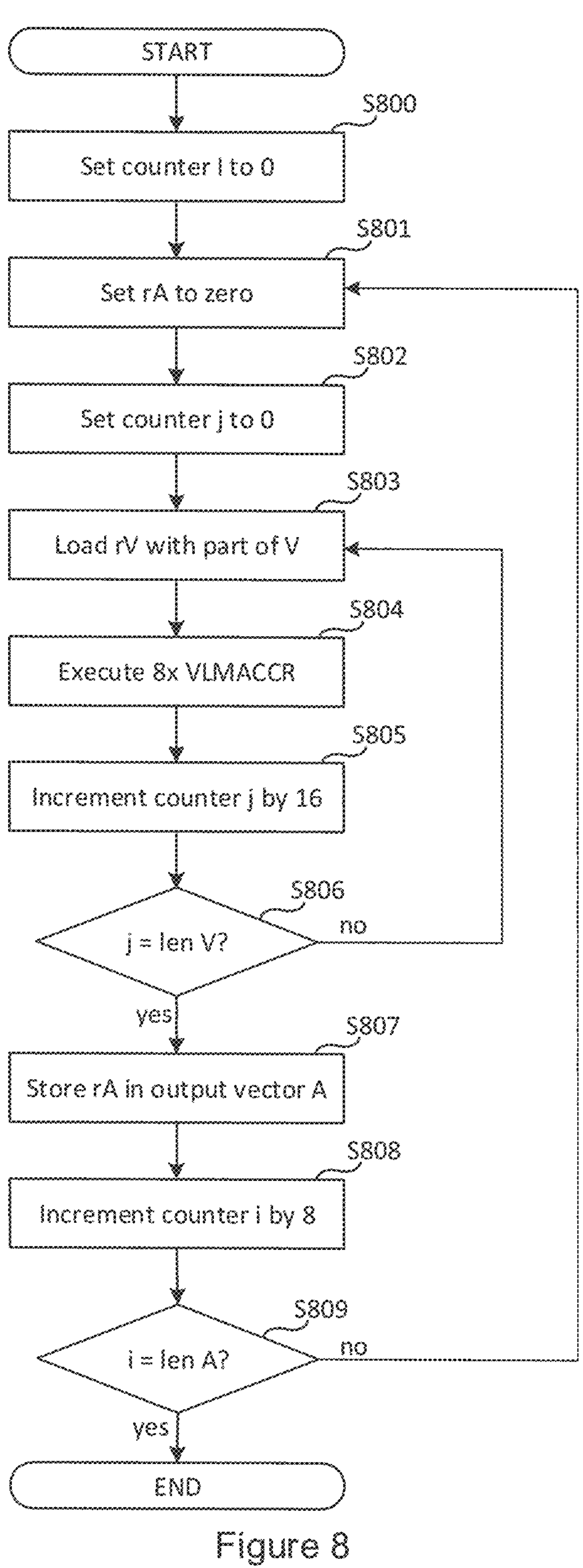
FIG. 8 shows schematically another example method performed by the processing unit.

FIG. 8, described later, illustrates this program code as a flowchart.

For example, successive rows of a matrix (e.g. stored in memory 107) may be read in turn to be multiplied by the vector V stored in rV. In an alternative implementation, it is possible that the rows of the matrix are stored in a second input register. A VLMACCR operation is performed for each row of the matrix and the output vector A is automatically built up component-by-component in the output register rA.

An example will now be described with reference to FIGS. 4*a-d* in which the processing unit 200 is used to determine the product of a matrix M and a vector V. In this example, the matrix M comprises 32 columns and 8 rows. The vector unit 201 is able to process 16 elements at a time. The input register rV comprises 16 elements. Note that, in general, the input register rV should comprise the same number of elements as the vector unit 201 is able to process at once. The output register rA comprises 8 elements for holding the output vector A.

Figure 4A:
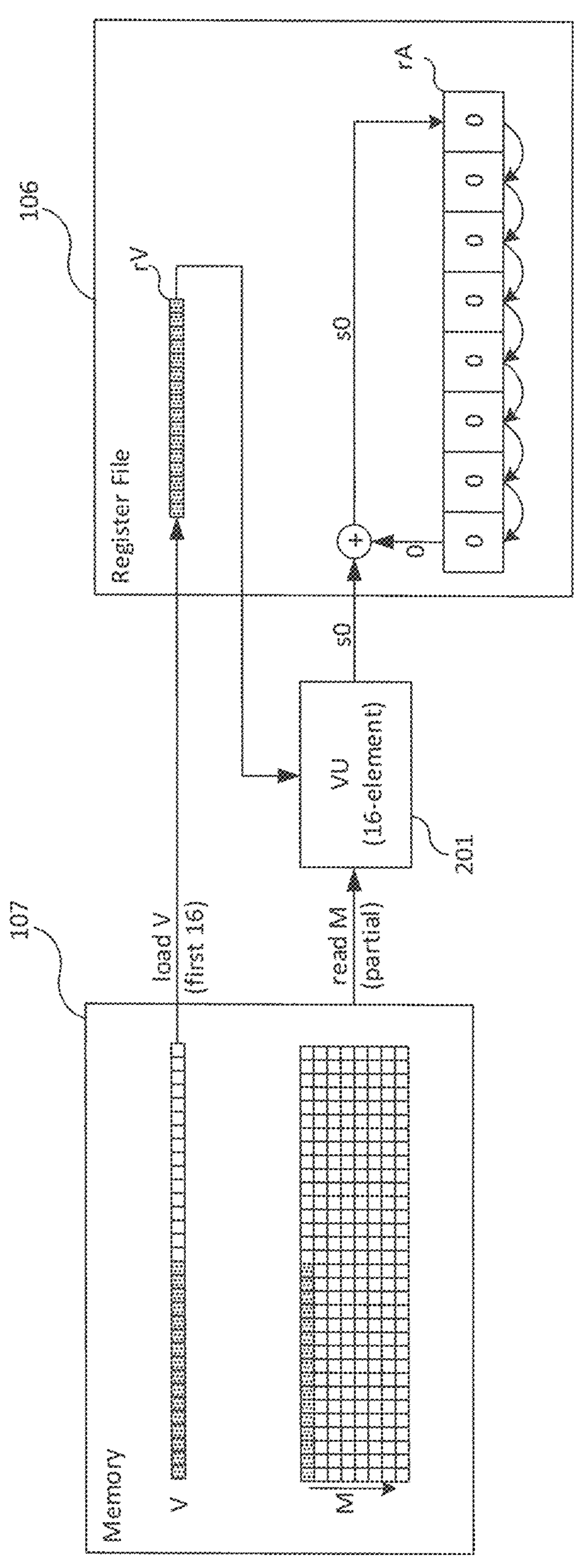
FIG. 4*a*-FIG. 4*d* illustrate a first example of the use of the vector processing instruction to process a matrix and a vector.

As illustrated in FIG. 4*a*, the values in the output register rA are first initialised to zero.

The first 16 components of the vector V are first read from memory 107 and stored in the input register rV.

Then, in response to a first VLMACCR instruction, the vector unit 201 operates on the first 16 components of the vector V stored in the vector register rV and the first 16 elements of the first row of the matrix M read from memory 107 to produce an output value s0. That is, the processing unit 200 is configured to operate on two vectors at a time, the first being the vector V and the second being the first (and subsequent) rows of the matrix M. In this example, the first vector V is stored in a register rV, but the second vector is read directly from memory 107 using a pointer. To operate on subsequent rows of the matrix M, it is a simple matter of adjusting the pointer. In other examples, the second vector may be stored in a vector register for operation on by the processing unit 200 (similarly to the first vector V). In such cases, the second vector (or a portion thereof) may be first read from the memory 107 to the second input register using a separate load instruction.

The rotation operation is then applied as described above. In this case, s0 gets added to the value from the first end element (left-most element) of the output register rA and placed in the second end element (right-most element). All other values in the output register rA get shifted one element to the left.

Figure 4B:
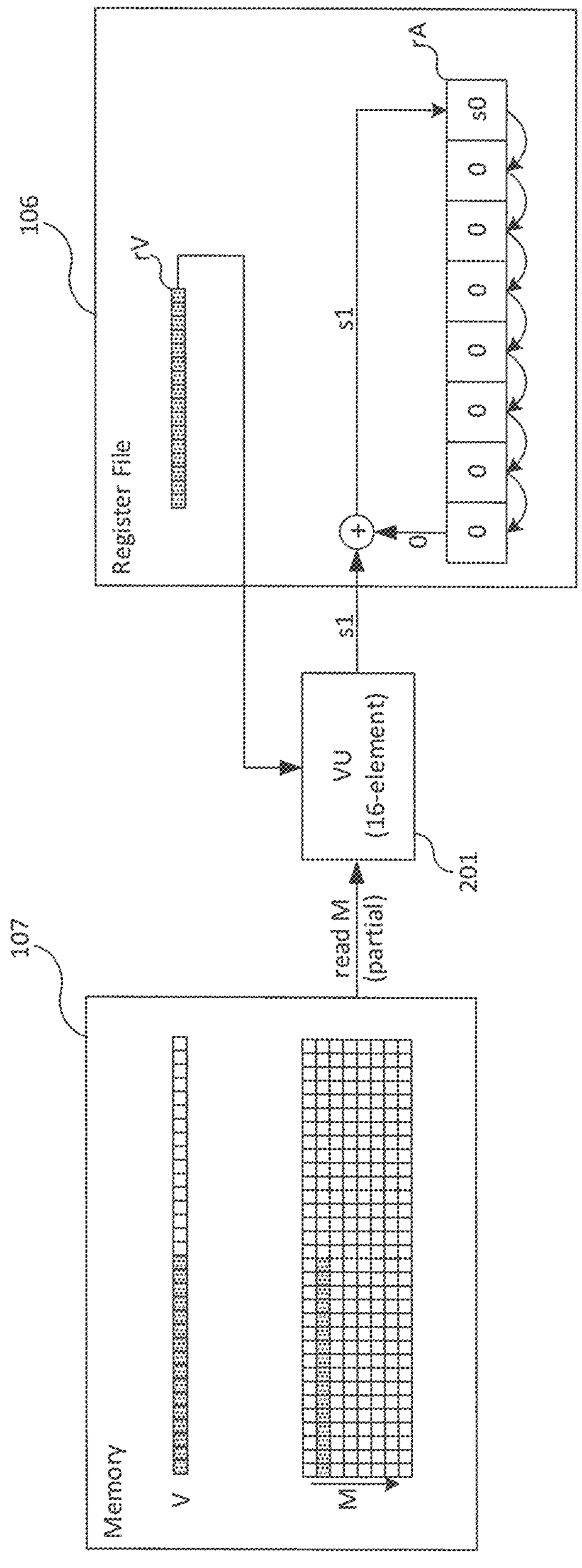

The next steps are illustrated in FIG. 4*b*. In response to a second VLMACCR instruction, the vector unit 201 operates on the first 16 components of the vector V stored in the vector register rV and the first 16 elements of the second row of the matrix M read from memory 107 to produce an output value s1. Note that V is re-used and therefore does not need to be re-loaded to rV.

The rotation operation is then applied. In this case, s1 gets added to the value from the first end element (left-most element) of the output register rA and placed in the second end element (right-most element). All other values in the output register rA get shifted one element to the left (including s0 written earlier).

This process then continues until the first 16 values from each of the 8 rows of matrix M have been processed. In other words, the left-hand side of the matrix M is swept out by the vector unit 201 to produce a first set of "partial sums" which are stored as the elements in the output register rA. The resulting state of the output vector register rA is as follows: [s0][s1][s2][s3][s4][s5][s6][s7].

Figure 4C:
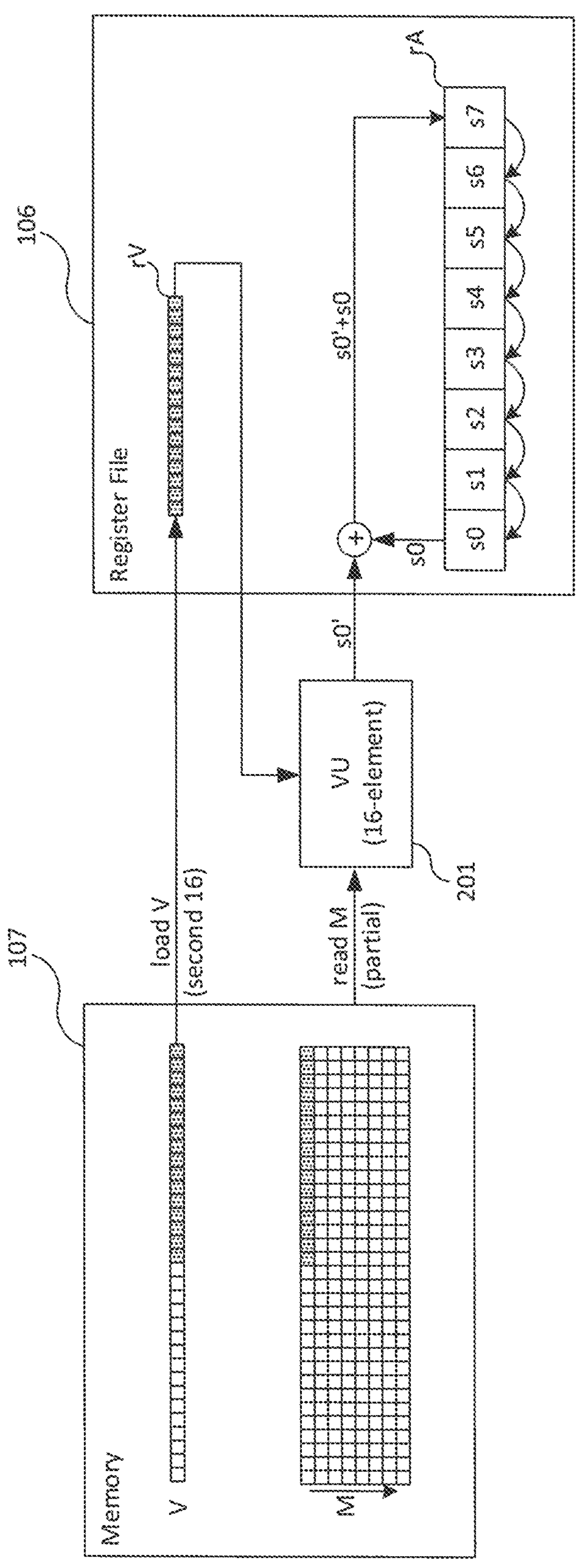

As illustrated in FIG. 4*c*, the second 16 components of the vector V are then loaded from memory 107 to the input register rV.

In response to a $9^{th}$ VLMACCR instruction, the vector unit 201 operates on the second 16 components of the vector V stored in the vector register rV and the second 16 elements of the first row of the matrix M read from memory 107 to produce an output value s0'.

The rotation operation is then applied as described above. In this case, s0' gets added to the value s0 from the first end element (left-most element) of the output register rA and the result s0'+s0 is placed in the second end element (right-most element). All other values in the output register rA get shifted one element to the left.

Figure 4D:
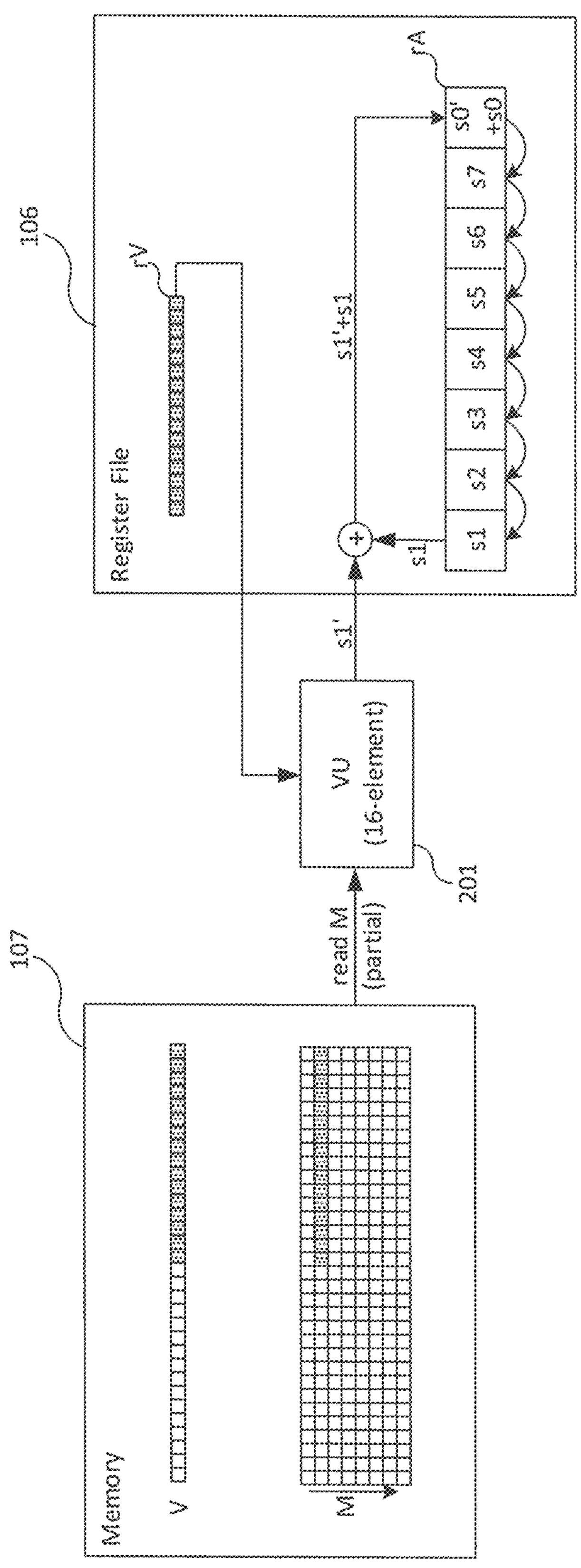

The next steps are illustrated in FIG. 4*d*. In response to another VLMACCR instruction, the vector unit 201 operates on the second 16 components of the vector V stored in the vector register rV and the second 16 elements of the second row of the matrix M read from memory 107 to produce an output value s1'. Note again that V is re-used and therefore does not need to be re-loaded to rV.

The rotation operation is then applied. In this case, s1' gets added to the value s1 from the first end element (left-most element) of the output register rA and placed in the second end element (right-most element). All other values in the output register rA get shifted one element to the left.

This process then continues until the second 16 values from each of the 8 rows of matrix M have been processed. In other words, the right-hand side of the matrix M is swept out by the vector unit 201 to produce a second set of "partial sums" which are added to the first set of partial sums determined earlier and stored as the elements in the output register rA. The resulting state of the output vector register rA is as follows: [s0'+s0][s1'+s1][s2'+s2][s3'+s3][s4'+s4][s5'+s5][s6'+s6][s7'+s7]. This is the final answer, as desired (i.e. the vector resulting from the multiplication of V by M).

Of course, the above has been described with reference to a matrix M and vector V which are exactly twice as long as the input register rV (and twice as long can be handled by the vector unit 201), but the same VLMACCR operation can be used to perform similar operations for any length of input vectors.

If the input vector length (and width of the matrix M) is shorter than the input register rV, then the entire inner product (or other operation) can be performed at once.

If the input vector length is an integer multiple N of the length of rV, then the VLMACCR instruction can be used in the manner described above until N full rotations of the output vector rA have taken place.

If the input vector length is not a non-integer multiple of the length of rV, then a combination of the above applies. For example, using a 16-element vector unit 201 to process a 42-component vector operation will comprise two full rotations of the output register rA in which all 16 elements are used, followed by a third full rotation in which only 10 of the elements are used.

Figure 5A:
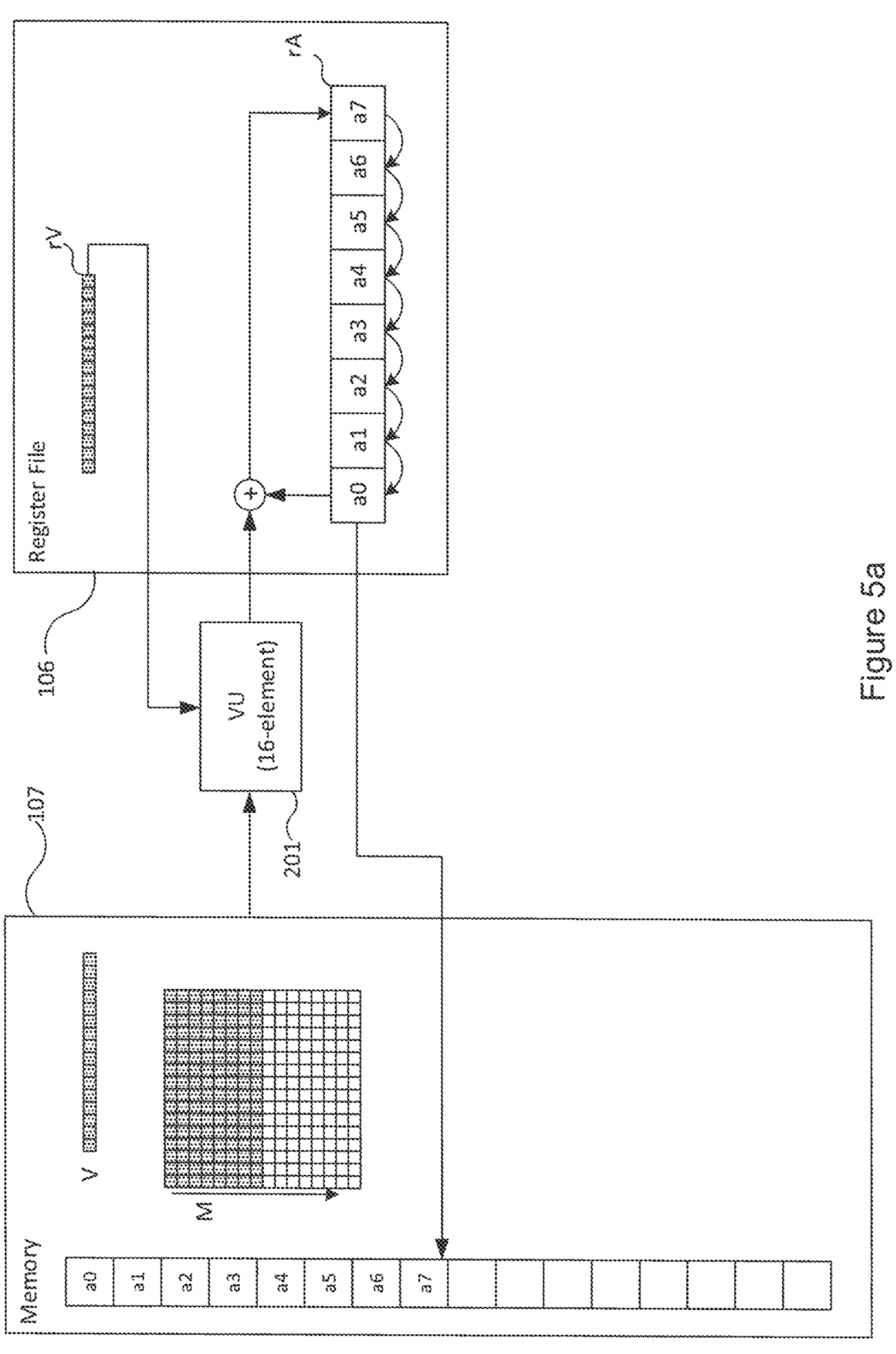
FIG. 5*a* and FIG. 5*b* illustrate a second example of the use of the vector processing instruction to process a matrix and a vector.
Figure 5B:
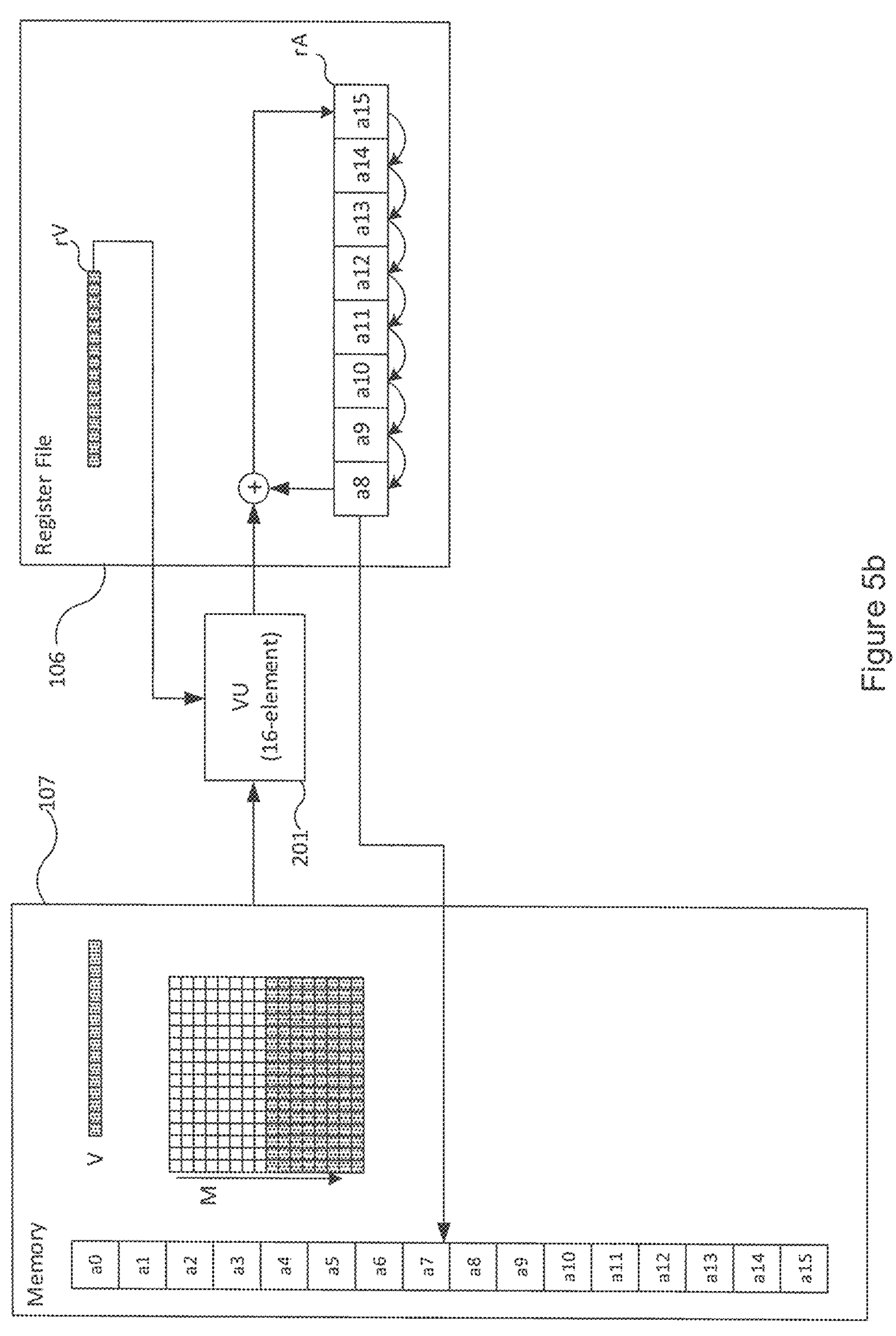

FIGS. 5*a* and 5*b* illustrate an example in which the matrix comprises 16 columns and 16 rows. The input register rV comprises 16 elements. The vector unit 201 is configured to process 16 elements at once. The output register rA comprises 8 elements.

The implementation of the VLMACCR operation itself is similar to that described above and so not repeated here.

In this case the vector unit 201 is capable of processing the entire inner product (or other operation) between each row of the matrix M and the vector V in one go. Therefore, no repeated rotations are required involving partial sums as before. However, the matrix comprises 16 rows which means that the final (desired) output vector will have 16 components, which is too long for the output register rA. Therefore, the processing unit 200 is configured to (e.g. instructed to, by program code), once the first 8 rows of the matrix M have been processed by the vector unit 201, output the values from the elements of the output register rA to a storage location, e.g. the memory 107 as shown in FIG. 5*a*. Note that in the example code given above, it is the outer for-loop which performs this action.

Then, as illustrated in FIG. 5*b*, the processing unit 200 (after re-setting the output register to zero) continues by processing the next (final) 8 rows of the matrix M in a similar manner. The final result vector is then constructed, e.g. at the storage location as illustrated in FIG. 5*b*, by concatenating the values from the second process onto the end of the values from the first process already stored in the storage location.

In all the above examples, the number of rows of the matrix M was equal to an integer multiple of the number of elements in the output register rA. In cases where the matrix M comprises any other number of rows, the process is the same until there are a number of rows remaining to process which is less than the number of elements in the output register rA. These "residual" rows can still be processed using the VLMACCR instruction as described above, however, the values present in the output register rA will need to be re-aligned so that the first value (s0 and a0 in the above examples) is present in the first element of the output register rA. Hence, the processing unit 200 may be configured to apply additional rotation operations. This can either be done by implementing a standard rotation operation, or by implementing one or more "dummy" VLMACCR operations on a null-vector (containing all zeroes) either from memory 107 or from the input register rV.

In another example implementation, the output from the vector unit 201 is simply written to the output register rA and the output register rA is rotated (either left or right). This is illustrated in FIG. 6.

This still has the advantages of enabling the output vector to be automatically constructed by repeated application of the instruction, without requiring repeated loading of values or any extra information to specify the location in the vector register, however it can only be used for one full rotation of the output register rA. If the input matrix comprises more rows than there are elements in the output register rA, additional operations are required. These are described below.

Figure 6:
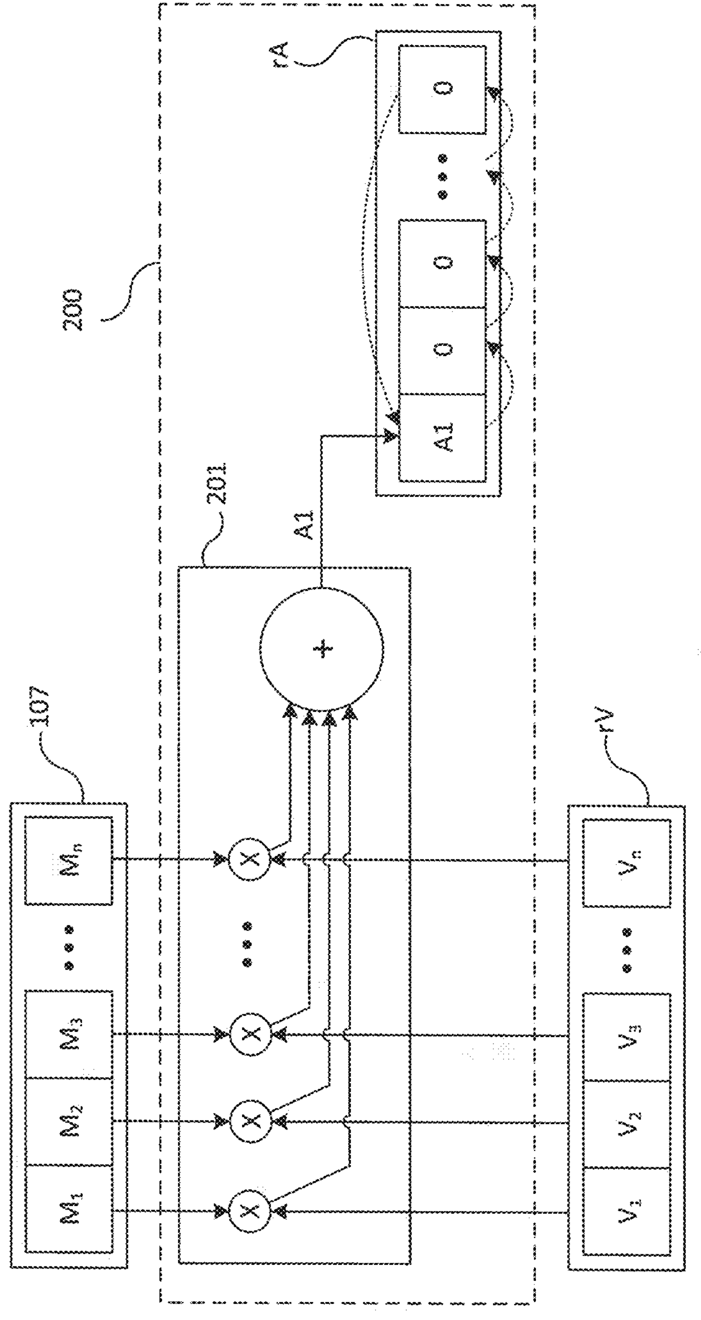
FIG. 6 shows schematically a second example implementation of a vector processing instruction.
Figure 7:
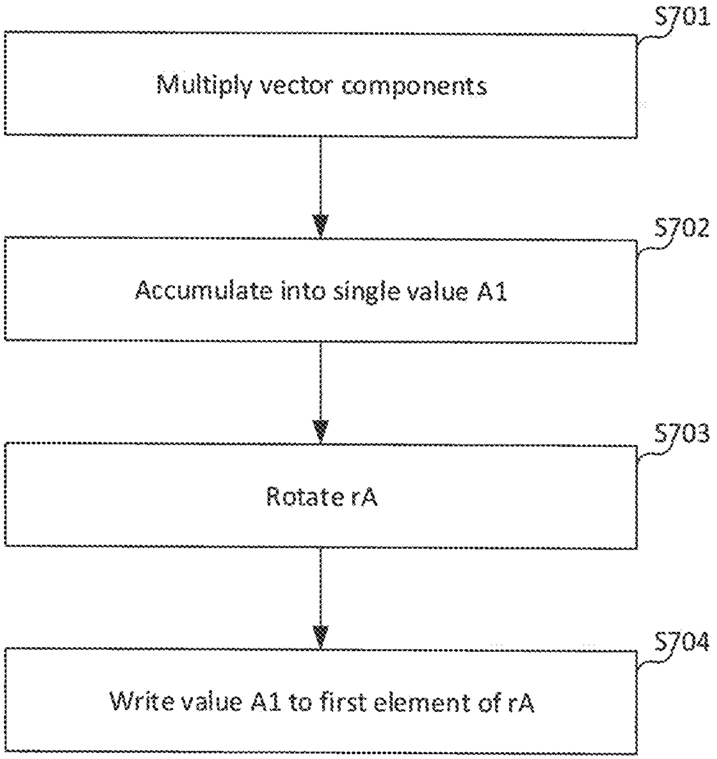
FIG. 7 shows schematically an example method performed by the processing unit.

FIG. 7 shows schematically an example method performed by the processing unit 200 in the example shown in FIG. 6. The processing unit 200 is configured to perform the method in response to a single instruction, again referred to herein as the VLMACCR instruction.

At S701, respective components from vector M and vector V are multiplied by the vector unit 201. That is, the vector unit 201 multiplies the value in the nth element of rM by the value in the nth element of rV. Each individual multiplication operation results in a scalar value.

At S702, the scalar values are accumulated by the vector unit 201 into a single result value A1. That is, the vector unit 201 sums the scalar values resulting from each multiplication operation to produce the result value A1. The vector unit 201 provides the result value A1 to the register rA.

Steps S701 and S702 together correspond to the vector unit 201 determining an inner product of the two input vectors. Hence, in this example the result value A1 is a scalar value. As mentioned above, operations other than an inner product may be performed by the vector unit.

At S703, the output register rA performs a rotation operation (also called a circular shift). An example of this is illustrated schematically by dotted arrows in FIG. 6. The rotating operation may be performed in parallel with (at the same time as) the multiplication and accumulation operations. In general, the operation may be pipelined, e.g. one stage for memory, one stage for multiplication, and one stage for a tree of additions implementing the accumulator.

Rotation operations themselves are known. In the example illustrated in FIG. 6, the output register rA performs a "left rotation" in which all values get shifted to the left, and the value from the first end element gets written to the second end element. That is, the value present in the first element gets written to the last element of the output register rA and the values present in all other elements n get written to the n−1th element of rA. In other examples the output register rA may perform a "right rotation" in which the values are moved in the opposite direction (i.e. the value present in the second end element gets written to the first end element, and the values present in all other elements n get written to the n+1th element). This is discussed in more detail later below.

At S704, the result value A1 is written to the first element of the output register rA. That is, the output register rA stores the result value received from the vector unit 201 to the first element of the output register rA. In this example, the first element of the output register rA is the left-most element as illustrated in FIG. 6.

In the example described above, the rotation operation is performed before the result value A1 is written to the first element of the output register rA. In other examples, the output register rA may be rotated (in either direction) after the output value is written to the first element.

There are therefore four possible combinations of operation order (rotate first or write first) and rotation direction (left or right). This will now be explained with reference to a simple example in which a 4×4 matrix M is multiplied by a 4-component vector V by repeated instances of the VLMACCR instruction. In the example, the VLMACCR operation is applied four time to produce four result values $A_1$-$A_4$. In this example, the output register rA is also four elements in size.

Consider a first example in which the VLMACCR operation comprises first rotating the output register rA to the right, and then writing the result from the vector unit 201 to the first element of the output register rA. After four VLMACCR operations, the output register rA contains the final vector A: each element component $A_1$-$A_4$ of the vector A being present in a different element of the output register rA. Importantly, the components $A_1$-$A_4$ are in the correct order. The vector A may then be output e.g. to memory 107 or some other storage location.

Consider a second example in which the VLMACCR operation comprises first writing the result from the vector unit 201 to the first element of the output register rA, and then rotating the output register rA to the left. Similarly to before, after four VLMACCR operations, the output register rA contains the final vector A: each element component $A_1$-$A_4$ of the vector A being present in a different element of the output register rA. Importantly, the components $A_1$-$A_4$ are in the correct order. The vector A may then be output e.g. to memory 107 or some other storage location. Note that in this example the elements $A_1$-$A_4$ of the vector A end up in the opposite order relative to that in the first example.

Consider a third example in which the VLMACCR operation comprises first rotating the output register rA to the left, and then writing the result from the vector unit 201 to the first element of the output register rA. After four VLMACCR operations, the output register rA contains the components $A_1$-$A_4$ of the vector A, as before. However, unlike the previous examples, the components $A_1$-$A_4$ are not in the correct order. An additional correction operation can be implemented to account for this. In this example, the correction operation comprises a left-rotation. Three right-rotations could also be used.

Consider a fourth example in which the VLMACCR operation comprises first writing the result from the vector unit 201 to the first element of the output register rA, and then rotating the output register rA to the right. Similarly to the third example, after four VLMACCR operations, the output register rA contains the components $A_1$-$A_4$ of the vector A but not in the correct order. Again, an additional correction operation can be implemented to account for this. In this example, the correction operation comprises a left-rotation. Three right-rotations could also be used.

In all the examples given above, the length of the output register rA was assumed to be the same length as the vector A to be calculated. However, the output register rA will have a fixed size (e.g. 32 elements), whereas the vector A to be determined may have a size less than or greater than this (e.g. less than or greater than 32 components). The case where the vector A comprises more components than there are elements in the output register rA was discussed earlier.

In cases where the vector A comprises fewer components than there are elements in the output register, rA, all elements of the vector A will be present (somewhere) in the output register rA upon completion of the VLMACCR instructions. Additional operations may or may not be required to "re-align" the values, similarly to as discussed above.

The nature of these additional operations depends on the specific implementation of the VLMACCR instruction. This can be explained by considering the four examples discussed above, but wherein the first three VLMACCR instructions are the only ones carried out. This corresponds to an example in which the output register rA is four elements long and is used as part of an operation to calculate a vector A having only three components.

In the first example, the state of the output register rA after three VLMACCR instructions is as follows: [A3][A2][A1][0]. An additional right-rotation operation can be used to realign the elements of the result vector A.

In the second example, the state of the output register rA after three VLMACCR instructions is as follows: [0][A1][A2][A3]. An additional left-rotation operation can be used to realign the elements of the result vector A.

In the third example, the state of the output register rA after three VLMACCR instructions is as follows: [A3][0][A1][A2]. Two additional left-rotation operations can be used to realign the elements of the result vector A.

In the fourth example, the state of the output register rA after three VLMACCR instructions is as follows: [0][A3][A2][A1]. In this case, no additional operations are required.

FIG. 8 is a flowchart illustrating a method in accordance with an example described herein in which the processing unit 200 is configured to use a counter to keep track of how many VLMACCR instructions have been performed in the current cycle. The counter may be reset at the start of the method.

The method illustrated in FIG. 8 represents all but the outer-most for-loop of the code shown below (which was also presented and described above):

```
def matrixXvector(A, M, V):
  for i in range (0, len(A), 8):
    rA[ ] = 0
    for j in range (0, len(V), 16):
      rV = V[j:j+16]
      for k in range (8):
        vlmaccr(address_of(M[i+k, j:j+16))
    A[i:i+8] = rA
```

That is, the flowchart represents an example method of implementing the inner product of a single row of the matrix M with the vector V from rV.

In this example, the output vector A comprises an integer multiple of 8 components, and the input vector V comprises an integer multiple of 16 components, and we assume that the vector unit 201 can perform 16 multiply-adds simultaneously into a rotating accumulator rA of 8 elements.

At S800 the processing unit 200 resets the counter i to 0, indicating that we are computing the first part of the output vector A.

At S801, the processing unit 200 resets the output register rA by resetting all the accumulator values to zero (i.e. so that the value present in each element of the output register rA is zero).

At S802 the processing unit 200 resets the counter j to 0, indicating that we are processing the first 16 columns of the matrix M (i.e. the first 16 elements from the first row of M).

At S803 the processing unit 200 loads the first 16 values of the input vector V to be multiplied with the first 16 columns of the matrix M. In subsequent iterations, j will be changed to point to a latter part of the vector, and at S803 the processing unit 200 loads the second 16, the third 16, etc of the vector to be multiplied with the second, 16, third 16, etc. rows of the matrix.

At S804, the processing unit 200 implements the eight VLMACCR instructions, using rows i, i+1, i+2, i+7 in the matrix.

At S805, the processing unit 200 increments the counter j by 16, in order to advance S803 and S804 to operate on the next part of the vector V and the matrix M.

At S806, the processing unit 200 determines whether the counter j is equal to the length of the input vector V (i.e. if it has reached the end of the portion of the matrix M). If so, there are no remaining VLMACCR instructions and the method proceeds to S807. Otherwise, steps S803, S804, and S805 are processed again in order to iterate over the next 16 columns of the matrix M.

At S807, the processing unit 200 outputs the values present in the output register rA to another storage location, e.g. memory 107. This is because it was determined at S806 that the output register rA has completed a set of full rotations, meaning that all the elements of the output register rA now hold values from the vector unit 201 resulting from the present calculation.

At S808, the processing unit 200 increments the counter i by 8, in order to advance the row address used in S804 to operate on the next part of the matrix M.

At S809, the processing unit 200 determines whether the value of counter i is equal to the number of elements in the output vector V ("n"). That is, the processing unit 200 determines whether the output register rA has been stored in each part of the output vector V since the method began at S800. If yes, the method ends. If no, the method proceeds to S801.

The processor may be a pipelined processor. In a pipelined processor, the execution unit is divided into a series of pipeline stages, each for performing a particular type of operation. The pipeline will typically include a fetch stage, decode stage, a register read stage, at least one compute stage, and one or more memory access stages. The instruction fetch stage fetches a first instruction from memory and issues it into the first stage of the pipeline. In the next processor cycle the decoded instruction passes down to the next stage in the pipeline, e.g. the register read stage. At the same time, the fetch stage fetches a second instruction from the instruction memory into the decode stage. In the next successive processor cycle after that, the first instruction is passed to the third pipeline stage, e.g. compute stage, while the second instruction is passed to the second pipeline stage, and a third instruction is issued into the first pipeline stage, and so forth. This helps keep the processor busy and thereby reduces latency, since otherwise the processor would need to wait for a whole instruction to execute before issuing the next into the execution unit.

The processor may be a multi-threaded processor. In a multi-threaded processor, the processor comprises a plurality of sets of context registers, each set of context registers representing a context (i.e. program state) of a respective one of multiple currently-executing program threads. The program state comprises a program counter for the respective thread, operands of the respective thread, and optionally respective status information such as whether the thread or context is currently active. The processor further comprises a scheduler which is configured to control the instruction fetch stage to temporally interleave instructions through the pipeline, e.g. in a round-robin fashion. Threads interleaved in such a manner are said to be executed concurrently. In the case where the execution unit is pipelined, then as the instruction of one thread advances through the pipeline from one pipeline stage to the next, the instruction of another thread advances down the pipeline one stage behind, and so forth. This interleaved approach is beneficial as it provides more opportunity for hiding pipeline latency. Without the interleaving, the pipeline would need mechanisms to resolve dependencies between instructions in the pipeline (the second instruction may use the result of the first instruction, which may not be ready in time), which may create a pipeline bubble during which the second and further instructions are suspended until the first instruction has completed execution.

Reference is made herein to data storage for storing data. This may be provided by a single device or by plural devices. Suitable devices include for example a hard disk and non-volatile semiconductor memory (including for example a solid-state drive or SSD).

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A processing unit for generating an output vector, the processing unit comprising:
- an output register having a plurality of elements for holding different components of the output vector, the plurality of elements including a first end element and a second end element; and
- a vector unit for processing at least two input vectors to generate respective result values;
- wherein the processing unit is configured to execute machine code instructions, each instruction being an instance of a predefined set of instruction types in an instruction set of the processing unit, wherein the instruction set includes a vector processing instruction defined by a corresponding opcode, the vector processing instruction causing the processing unit to perform operations of:
- processing, using the vector unit, a first input vector and a second input vector to generate a result value; and
- performing a rotation operation on the plurality of elements of the output register in which the sum of the result value and a value present in the second end element before said rotation is placed in the first end element of the output register.

2. The processing unit according to claim 1, wherein the vector unit is configured to perform said processing of the first input vector and second input vector by performing a multiply-accumulate operation on the input vectors, the result value being a scalar value resulting from the multiply-accumulate operation.

3. The processing unit according to claim 1, wherein the vector unit is configured to access at least the second input vector directly from a memory.

4. The processing unit according to claim 1, comprising an input register for holding at least the first input vector, wherein the vector unit is configured to access the first input vector from the input register.

5. The processing unit according to claim 4, wherein the input register is selected from a plurality of registers in a register file and wherein the vector processing instruction includes an operation specifying the input register.

6. The processing unit according to claim 4, wherein the input register is implicit in the opcode of the vector processing instruction, not specified by an operand of the vector processing instruction.

7. The processing unit according to claim 1, wherein the output register is selected from a plurality of registers in a register file and wherein the vector processing instruction includes an operand specifying the output register.

8. The processing unit according to claim 1, wherein the output register is implicit in the opcode of the vector processing instruction, not specified by an operand of the vector processing instruction.

9. A method, performed by a processing unit, of generating an output vector at an output register having a plurality of elements for holding different components of the output vector, the plurality of elements including a first end element and a second end element, wherein the processing unit is configured to execute machine code instructions, each instruction being an instance of a predefined set of instruction types in an instruction set of the processing unit, wherein the instruction set includes a vector processing instruction defined by a corresponding opcode, the method comprising the vector processing instruction causing the processing unit to implement a vector processing operation of:

processing, using the vector unit, a first input vector and a second input vector to generate a result value; and performing a rotation operation on the plurality of elements of the output register in which the sum of the result value and a value present in the second end element before said rotation is placed in the first end element of the output register.

10. The method according to claim 9, in which the first input vector is stored in a register and wherein the method comprises executing a plurality of said vector processing operations using the same first input vector.

11. The method according to claim 10, comprising, following completion of a plurality of said vector processing operations, outputting the values present in the output register to a storage location.

12. The method according to claim 10, comprising, following completion of a plurality of vector processing operations which is not equal to an integer multiple of the number of elements in the output register, performing one or more rotation operations on the output register without altering the values present in the elements of the output register such that the total number of rotations is equal to an integer multiple of the number of elements in the output register.

* * * * *